US009682610B2

(12) United States Patent
Duan et al.

(10) Patent No.: US 9,682,610 B2
(45) Date of Patent: Jun. 20, 2017

(54) INTELLIGENT AUTOMOTIVE AIR-QUALITY ASSESSMENT AND MANAGEMENT

(71) Applicant: International Business Machines Corporation, Armonk, NY (US)

(72) Inventors: Ning Duan, Beijing (CN); Xiao Bo Li, Ningbo (CN); Jing Liu, Ningbo (CN); Wei Sun, Beijing (CN); Xin Tang, Ningbo (CN); Zhi Hu Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/887,522

(22) Filed: Oct. 20, 2015

(65) Prior Publication Data
US 2017/0106715 A1 Apr. 20, 2017

(51) Int. Cl.
*B60H 1/00* (2006.01)
*B60H 1/24* (2006.01)

(52) U.S. Cl.
CPC ......... *B60H 1/008* (2013.01); *B60H 1/00764* (2013.01); *B60H 1/24* (2013.01)

(58) Field of Classification Search
CPC ...... B60H 1/008; B60H 1/24; B60H 1/00764; B60H 1/00849; B60H 1/99771; B60H 1/00792
See application file for complete search history.

(56) References Cited

U.S. PATENT DOCUMENTS 4,437,391 A * 3/1984 Eguchi ................... B60H 1/008
165/249
5,259,813 A * 11/1993 Abthoff ................. B60H 3/0085
454/139
(Continued)

FOREIGN PATENT DOCUMENTS

CN 202156375 U 3/2012
CN 102837580 A 12/2012
(Continued)

OTHER PUBLICATIONS

Galatsis, Kosmas et al., "Car Cabin Air Quality Sensors and Systems", Encyclopedia of Sensors, http://www.co-gas-expert.com/wp-content/uploads/2012/12/Encyclopedia_Chapter.pdf, vol. X, Published 2006, 11 pages.

*Primary Examiner* — Michael J Zanelli
(74) *Attorney, Agent, or Firm* — Francis Lammes; Stephen J. Walder, Jr.; Alexa L. Ashworth

(57) ABSTRACT

A mechanism is provided for controlling the internal air-quality of a vehicle. Responsive to determining that a speed of a vehicle fails to be above the predetermined low-speed threshold, a determination is made as to whether an internal air-quality from an internal air-quality sensor is better than the external air-quality from an external air-quality sensor. Responsive to the internal air-quality being better than the external air-quality, a ventilation control mechanism is signaled to utilize a recirculating-air mode, wherein the ventilation control mechanism either stays in an already initiated recirculation-air mode or switches to the recirculating-air mode. Responsive to the internal air-quality being worse than the external air-quality, the ventilation control mechanism is signaled to utilize a fresh-air mode, wherein the ventilation control mechanism either stays in an already initiated fresh-air mode or switches to the fresh-air mode.

20 Claims, 5 Drawing Sheets

(56) References Cited

U.S. PATENT DOCUMENTS

| | | | |
|---|---|---|---|
| 6,800,022 B2 | 10/2004 | Urbank et al. | |
| 7,554,440 B2 * | 6/2009 | Kadaba | G01N 33/0075 340/539.22 |
| 8,032,123 B2 * | 10/2011 | Sakhpara | H04B 17/23 455/412.1 |
| 8,092,285 B2 * | 1/2012 | Mathur | B60H 1/00764 454/75 |
| 2009/0312905 A1 * | 12/2009 | Marra | B60H 1/00792 701/36 |
| 2009/0326760 A1 * | 12/2009 | Clark | B60H 1/00771 701/36 |
| 2010/0144261 A1 * | 6/2010 | Barkic | B60H 1/00457 454/75 |
| 2012/0293315 A1 * | 11/2012 | Schunder | G08G 1/096775 340/438 |

FOREIGN PATENT DOCUMENTS

| | | | |
|---|---|---|---|
| CN | 103434463 A | | 12/2013 |
| CN | 203410399 U | | 1/2014 |
| DE | 3526462 A1 * | | 1/1987 |
| WO | WO2014089785 A1 | | 6/2014 |

* cited by examiner

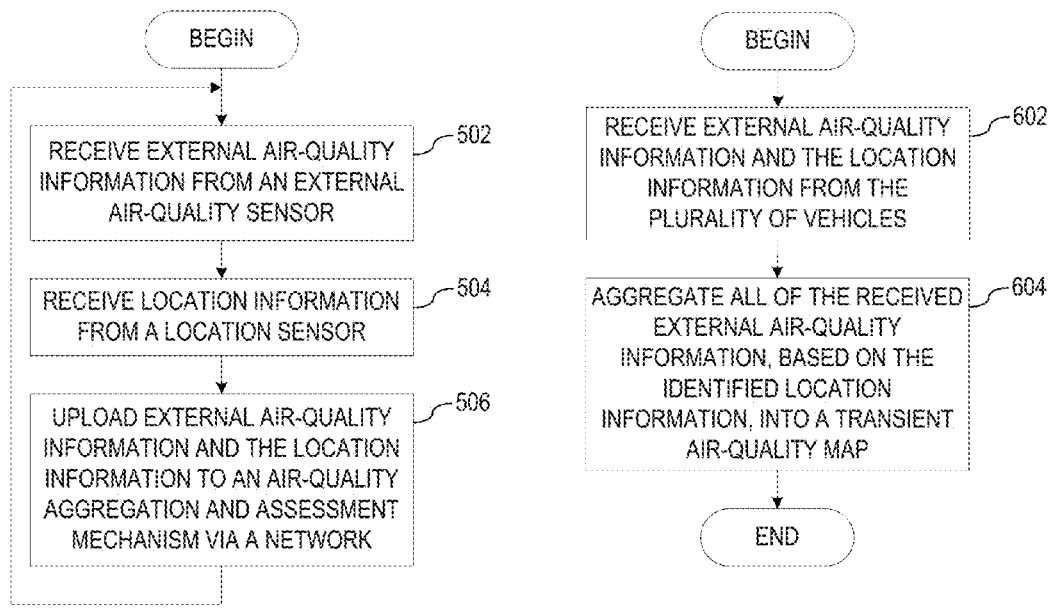
FIG. 5
FIG. 6
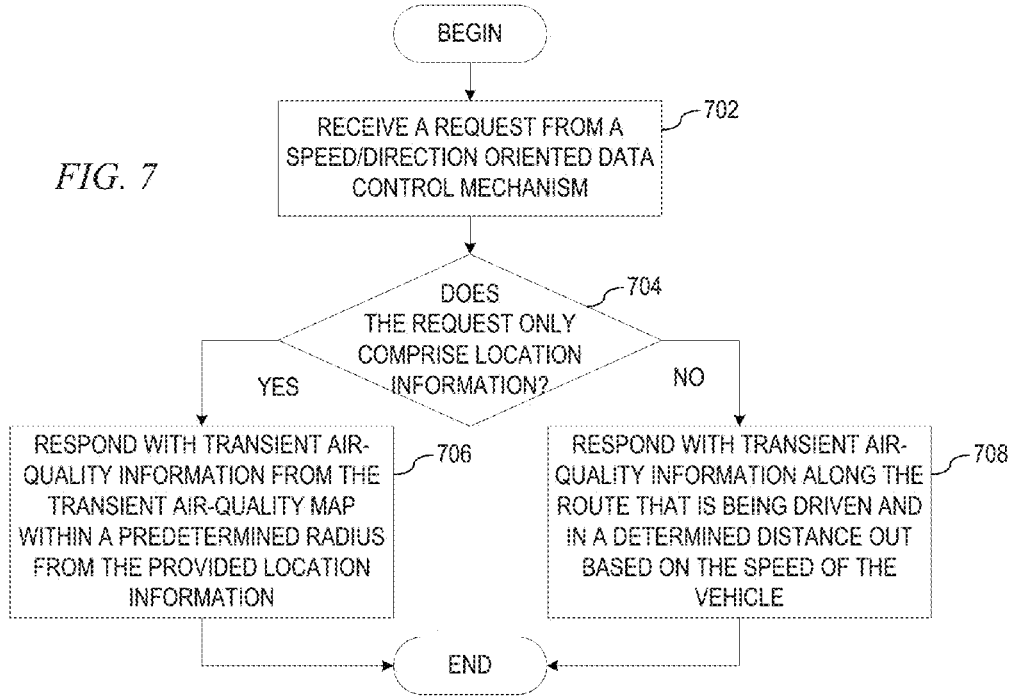
FIG. 7

INTELLIGENT AUTOMOTIVE AIR-QUALITY ASSESSMENT AND MANAGEMENT

BACKGROUND

The present application relates generally to an improved data processing apparatus and method and more specifically to mechanisms for intelligent automotive air-quality assessment and management.

Air pollution is an introduction of particulates, biological molecules, or other harmful materials into Earth's atmosphere, causing disease, death to humans, damage to other living organisms such as food crops, or the natural or built environment. Air pollution may come from anthropogenic, i.e. an effect or object resulting from human activity, or natural sources. Some of the main anthropogenic sources include: traffic, coal-burning, industry production, and dust emission. Current research shows that, among all the different types of commuting, travelling by car exposed individuals to the worst air-quality and thus, individuals suffer from various types of pollutants such as particular matter, black carbon, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for controlling the internal air-quality of a vehicle. The illustrative embodiment determines whether a speed of the vehicle from a speed sensor in the vehicle is above a predetermined low-speed threshold. The illustrative embodiment determines whether an internal air-quality from an internal air-quality sensor is better than the external air-quality from an external air-quality sensor in response to determining that the speed fails to be above the predetermined low-speed threshold. The illustrative embodiment signals a ventilation control mechanism to utilize a recirculating-air mode, wherein the ventilation control mechanism either stays in an already initiated recirculation-air mode or switches to the recirculating-air mode in response to the internal air-quality being better than the external air-quality. The illustrative embodiment signals the ventilation control mechanism to utilize a fresh-air mode, wherein the ventilation control mechanism either stays in an already initiated fresh-air mode or switches to the fresh-air mode in response to the internal air-quality being worse than the external air-quality.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 depicts an exemplary flowchart of the operation performed by an intelligent automotive air-quality assessment and management mechanism in uploading external air-quality information to an air-quality aggregation and assessment mechanism in accordance with an illustrative embodiment;

FIG. 6 depicts an exemplary flowchart of the operation performed by an air-quality aggregation and assessment mechanism to aggregate external air-quality information received from a plurality of vehicles in accordance with an illustrative embodiment; and FIG. 7 depicts an exemplary flowchart of the operation performed by an air-quality aggregation and assessment mechanism to provide transient air-quality information in accordance with an illustrative embodiment.

DETAILED DESCRIPTION

Figure 1:
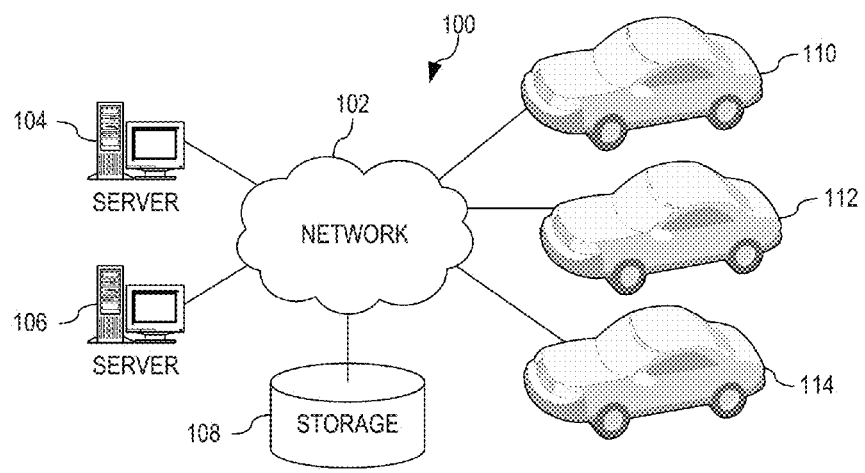
FIG. 1 is an example diagram of a distributed data processing system in which aspects of the illustrative embodiments may be implemented.

The illustrative embodiments provide mechanisms for intelligent automotive air-quality assessment and management. As noted above, current research shows that, among all the different types of commuting, travelling by car exposed individuals to the worst air-quality and thus, individuals suffers from various types of pollutants such as particular matter, black carbon, and the like. However, current automatic air control systems in a vehicle are only temperature aware and not air-quality aware. Therefore, currently, drivers are required to manually change the air circulation mode of the ventilation control mechanism between recirculating-air and fresh-air to maintain the air-quality in a vehicle. Manually changing the circulation mode of the air control system may be quite inaccurate and may even bring in more air pollutants. Thus, a driver may be exposed to air pollutants quite a long time before the driver realizes the air-quality is bad. That is, a driver may set the air circulation mode of the ventilation control mechanism to fresh-air when the external air-quality is even worse than the internal air-quality.

The illustrative embodiments provide an intelligent automotive air-quality assessment and management mechanism which utilizes internal and external air-quality sensors that collect instant air-quality information associated with the vehicle for air-quality management. Additionally, since the vehicle may be moving from one area to another at a fast pace, the intelligent automotive air-quality assessment and management mechanism also utilizes air-quality information shared from other vehicles to manage the vehicle's air-quality. That is, instant air-quality monitoring may not be sufficient for effective and accurate air-quality management. Since the vehicle may be moving at a fast pace one moment and slow moving or stopped the next moment, the external air-quality may change quickly and thus, predicting near-future external air-quality only based on current air-quality information associated with the vehicle may be imprecise. Therefore, the intelligent automotive air-quality assessment and management mechanism utilizes both internal and external air-quality sensors to collect current air-quality information, which is sampled based on a current speed of the vehicle. External air-quality sensor information is shared among users by uploading the external air-quality information to the "cloud." A cloud based air-quality assessment system aggregates the shared information and generates a transient air-quality map. The intelligent automotive air-quality assessment and management mechanism retrieves the transient air-quality map based on the vehicle's current direction and speed. The intelligent automotive air-quality assessment and management mechanism responds not only according to the current internal and external air-quality but also based on transient air-quality identified from the transient air-quality map retrieved based on the vehicle's speed and direction.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
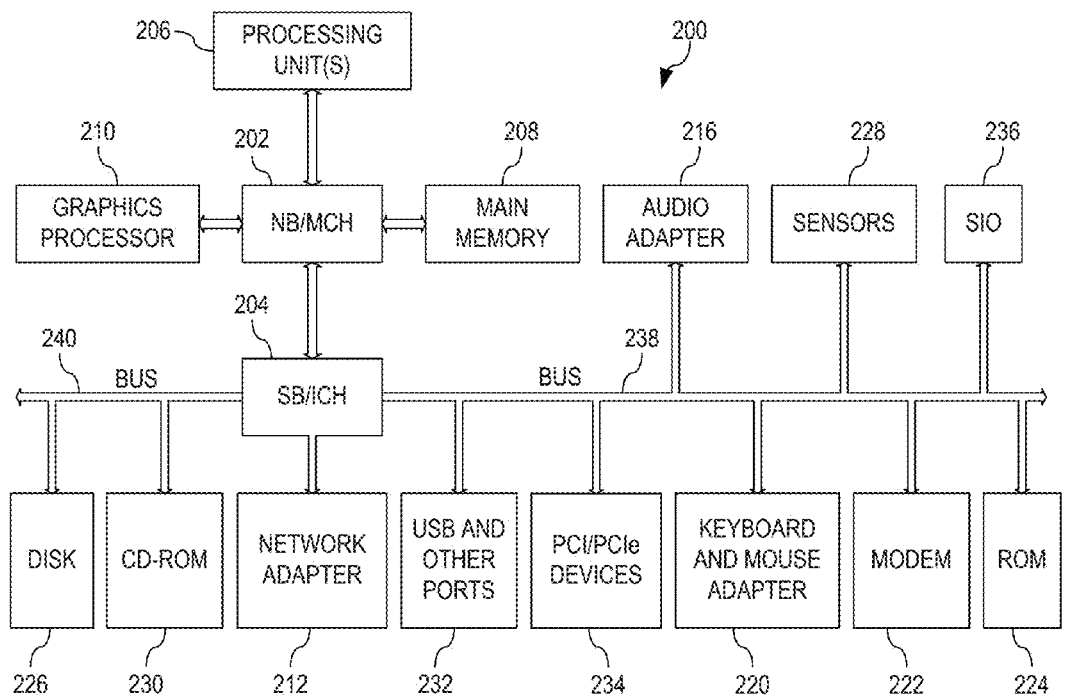
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, vehicles 110, 112, and 114 are also connected to network 102. These vehicles 110, 112, and 114 may be, for example, any type of vehicle that is equipped with sensors, such as cameras, ultrasound, infrared, a global positioning system (GPS), radar, or the like, and communication capabilities, such as Wi-Fi, Global System for Mobile Communications (GSM), Bluetooth, or the like, for precise localization, mapping, and data/information exchange. In the depicted example, server 104 provides data, such as boot files, operating system images, and applications to the vehicles 110, 112, and 114. Vehicles 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an intelligent automotive air-quality assessment and management mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates intelligent automotive air-quality assessment and management.

As noted above, the mechanisms of the illustrative embodiments utilize specifically configured computing devices, or data processing systems, to perform the operations for intelligent automotive air-quality assessment and management. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the intelligent automotive air-quality assessment and management mechanism.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
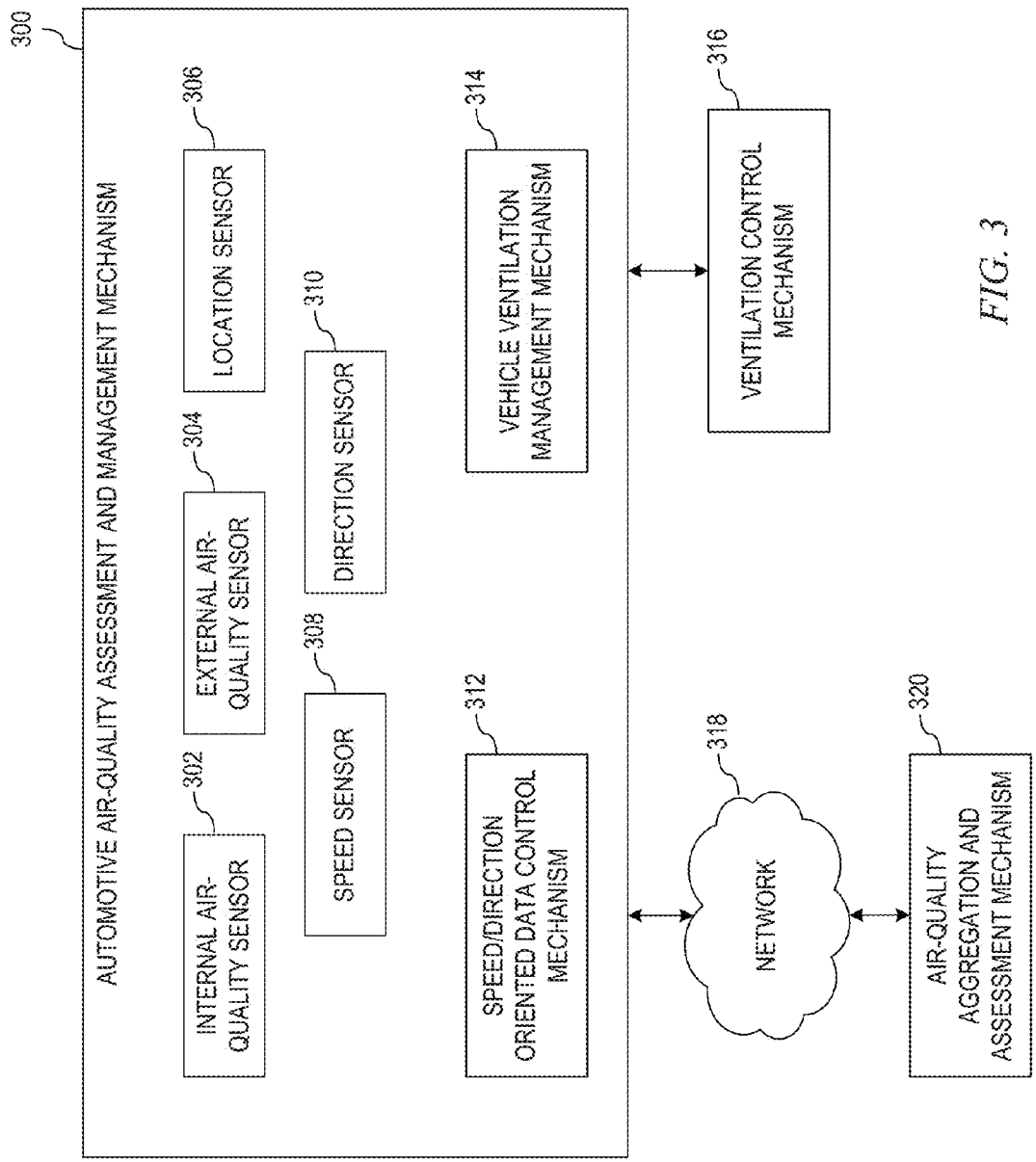
FIG. 3 depicts an exemplary block diagram of an intelligent automotive air-quality assessment and management mechanism in accordance with an illustrative embodiment.

FIG. 3 depicts an exemplary block diagram of an intelligent automotive air-quality assessment and management mechanism in accordance with an illustrative embodiment. Intelligent automotive air-quality assessment and management mechanism 300 comprises internal air-quality sensor 302, external air-quality sensor 304, location sensor 306, speed sensor 308, direction sensor 310, speed/direction oriented data control mechanism 312, vehicle ventilation management mechanism 314, and ventilation control mechanism 316. As a user operates a vehicle in which intelligent automotive air-quality assessment and management mechanism 300 resides, vehicle ventilation management mechanism 314 utilizes both internal air-quality information from an internal air-quality sensor 302 and external air-quality information from an external air-quality sensor 304 to assess whether the internal air-quality currently being experienced by the user is better or worse than the external air-quality and thus, determines whether the air circulation mode of the ventilation control mechanism 316 should be in a recirculating-air mode or a fresh-air mode. Internal air-quality sensor 302 detects internal air-quality information that includes specific pollutant values of pollution and other substances present in the cabin of the vehicle, such as carbon monoxide, lead, nitrogen oxides, volatile organic compounds, particulate matter, sulfur dioxide, carbon dioxide, methane, nitrous oxide, fluorinated gases, and the like. Similarly, external air-quality sensor 304 detects external air-quality information that includes specific pollutant values of pollution and other substances present outside the vehicle, such as carbon monoxide, lead, nitrogen oxides, volatile organic compounds, particulate matter, sulfur dioxide, carbon dioxide, methane, nitrous oxide, fluorinated gases, and the like.

However, since, depending on the speed of the vehicle, the external air-quality may change frequently, utilizing only the external air-quality information from the external air-quality sensor 304 may not be a valid assessment of the external air-quality that will occur in the near future. For example, if the vehicle is driving at higher rates of speed such as above a predetermined low-speed threshold, such as above 30 miles per hour, the external air-quality may deteriorate quickly in less than a minute. Thus, vehicle ventilation management mechanism 314 is equipped to access external air-quality information provided by other vehicles. That is, as the user's vehicle operates, as well as other vehicles equipped with an intelligent automotive air-quality assessment and management mechanism such as intelligent automotive air-quality assessment and management mechanism 300, vehicle ventilation management mechanism 314 uploads external air-quality information sensed by external air-quality sensor 304 as well as location information sensed by location sensor 306 at the time the external air-quality information was sensed to air-quality aggregation and assessment mechanism 320 via network 318. In an exemplary embodiment, air-quality aggregation and assessment mechanism 320 is a cloud-based system which vehicle ventilation management mechanism 314 accesses wirelessly through network 318.

Upon receiving the external air-quality information and associated location information from a plurality of vehicles, air-quality aggregation and assessment mechanism 320 aggregates all of the received external air-quality information, based on the identified location information, into a transient air-quality map, which may be accessed by speed/direction oriented data control mechanism 312 of intelligent automotive air-quality assessment and management mechanism 300. During operation of the vehicle, speed/direction oriented data control mechanism 312 utilizes information, such as a speed at which the vehicle is moving from speed sensor 308, a direction that the vehicle is moving from direction sensor 310, and a location information sensed by location sensor 306 to request transient air-quality information from air-quality aggregation and assessment mechanism 320.

Speed/direction oriented data control mechanism 312 and air-quality aggregation and assessment mechanism 320 may operate together in many different modes. In one exemplary mode, speed/direction oriented data control mechanism 312 may only provide location information to air-quality aggregation and assessment mechanism 320. In this mode, air-quality aggregation and assessment mechanism 320 responds to speed/direction oriented data control mechanism 312 with transient air-quality information from the transient air-quality map within a predetermined radius from the provided location information. Therefore, in this mode, speed/direction oriented data control mechanism 312 receives a larger set of information from air-quality aggregation and assessment mechanism 320 and analyzes the information based on the detected speed and direction to determine the near-future external air-quality. This mode may be utilized when the vehicle is operating above a predetermined low-speed threshold but below a predetermined high-speed threshold for example, at speeds between 30 miles per hour and 55 miles per hour, such as when the vehicle is being utilized in a city where traffic is flowing smoothly but the direction may change quickly.

In a second exemplary mode of operation, speed/direction oriented data control mechanism 312 provides speed, direction, and location information to air-quality aggregation and assessment mechanism 320. In this mode, air-quality aggregation and assessment mechanism 320 responds to speed/direction oriented data control mechanism 312 with transient air-quality information from the transient air-quality map along the route that is being driven, based on the location and direction information, and in a determined distance out based on the speed of the vehicle. Therefore, in this mode, speed/direction oriented data control mechanism 312 receives a reduced set of information from air-quality aggregation and assessment mechanism 320 and reduced further analysis of the information based on the detected speed and direction to determine the near-future external air-quality. This mode may be utilized when the vehicle is operating above the predetermined high-speed threshold for example, at speeds over 55 miles per hour, such as when the vehicle is being utilized on a highway when the direction does not change so frequently.

Thus, as a user operates a vehicle in which intelligent automotive air-quality assessment and management mechanism 300 resides, vehicle ventilation management mechanism 314 determines whether a sensed speed of the vehicle from speed sensor 308 is above the predetermined low-speed threshold. If the speed fails to be above the predetermined low-speed threshold, vehicle ventilation management mechanism 314 utilizes the internal air-quality from the internal air-quality sensor 302 and a more weighted external air-quality from the external air-quality sensor 304 and a less weighted near-future external air-quality from air-quality aggregation and assessment mechanism 320 to assess whether the internal air-quality currently being experienced by the user is better or worse than the external air-quality. If vehicle ventilation management mechanism 314 determines that the internal air-quality is better than the external air-quality, vehicle ventilation management mechanism 314 sends a signal to ventilation control mechanism 316 to utilize the recirculating-air mode. Conversely, if vehicle ventilation management mechanism 314 determines that the external air-quality is better than the internal air-quality, vehicle ventilation management mechanism 314 sends a signal to ventilation control mechanism 316 to utilize the fresh-air mode.

If the speed is above the predetermined low-speed threshold, then vehicle ventilation management mechanism 314 determines whether a sensed speed of the vehicle from speed sensor 308 is above the predetermined high-speed threshold. If the sensed speed is above the predetermined low-speed threshold but below the predetermined high-speed threshold, the speed/direction oriented data control mechanism 312 sends a request to air-quality aggregation and assessment mechanism 320 with location information. Air-quality aggregation and assessment mechanism 320 responds to speed/direction oriented data control mechanism 312 with transient air-quality information from the transient air-quality map within a predetermined radius from the provided location information. Speed/direction oriented data control mechanism 312 receives a larger set of information from air-quality aggregation and assessment mechanism 320 and analyzes the information based on the detected speed and direction to determine the near-future external air-quality. Based on the analysis, speed/direction oriented data control mechanism 312 provides vehicle ventilation management mechanism 314 with a near-future external air-quality. Vehicle ventilation management mechanism 314 utilizes the internal air-quality information from the internal air-quality sensor 302, the external air-quality information from the external air-quality sensor 304, and the near-future external air-quality from speed/direction oriented data control mechanism 312 to assess whether the internal air-quality currently being experienced by the user is better or worse than the external air-quality and the near-future external air-quality. If vehicle ventilation management mechanism 314 determines that the internal air-quality is better than the more weighted external air-quality and less weighted near-future external air-quality, vehicle ventilation management mechanism 314 sends a signal to ventilation control mechanism 316 to utilize the recirculating-air mode. Conversely, if vehicle ventilation management mechanism 314 determines that the more weighted external air-quality and less weighted near-future external air-quality is better than the internal air-quality, vehicle ventilation management mechanism 314 sends a signal to ventilation control mechanism 316 to utilize the fresh-air mode.

If the sensed speed is above the predetermined low-speed threshold and above the predetermined high-speed threshold, the speed/direction oriented data control mechanism 312 sends a request to air-quality aggregation and assessment mechanism 320 with speed, direction, and location information. Air-quality aggregation and assessment mechanism 320 responds to speed/direction oriented data control mechanism 312 with transient air-quality information from the transient air-quality map along the route that is being driven, based on the location and direction information, and in a determined distance out based on the speed of the vehicle. Speed/direction oriented data control mechanism 312 receives the reduced set of information from air-quality aggregation and assessment mechanism 320 and analyzes the information based on the detected speed and direction to determine the near-future external air-quality. Based on the analysis, speed/direction oriented data control mechanism 312 provides vehicle ventilation management mechanism 314 with a near-future external air-quality. Vehicle ventilation management mechanism 314 utilizes the internal air-quality information from the internal air-quality sensor 302, the external air-quality information from the external air-quality sensor 304, and the near-future external air-quality from speed/direction oriented data control mechanism 312 to assess whether the internal air-quality currently being experienced by the user is better or worse than the external air-quality. If vehicle ventilation management mechanism 314 determines that the internal air-quality is better than the more weighted near-future external air-quality and less weighted external air-quality, vehicle ventilation management mechanism 314 sends a signal to ventilation control mechanism 316 to utilize the recirculating-air mode. Conversely, if vehicle ventilation management mechanism 314 determines that the more weighted near-future external air-quality and less weighted external air-quality is better than the internal air-quality, vehicle ventilation management mechanism 314 sends a signal to ventilation control mechanism 316 to utilize the fresh-air mode.

In addition to the above, vehicle ventilation management mechanism 314 may increase or decrease a sampling frequency by the external air-quality sensor 304 as well as requesting transient air-quality information from air-quality aggregation and assessment mechanism 320 at different speeds. For example, at speeds below the predetermined low-speed threshold, vehicle ventilation management mechanism 314 may increase the sampling frequency by the external air-quality sensor 304 and decrease requests for near-future external air-quality information from air-quality aggregation and assessment mechanism 320, since near-future external air-quality information from other vehicles may have deteriorated since the last sample due to time differential and thus near-future external air-quality information would be weighted less while external air-quality information from the external air-quality sensor 304 would be weighted more.

At speeds above the predetermined low-speed threshold and below the predetermined high-speed threshold, vehicle ventilation management mechanism 314 may utilize a moderate sampling frequency by the external air-quality sensor 304 as well as moderate requests for near-future external air-quality information from air-quality aggregation and assessment mechanism 320, since both the external air-quality information from the external air-quality sensor 304 and the near-future external air from other vehicles may both be of equal weight. Finally, at speeds above the predetermined high-speed threshold, vehicle ventilation management mechanism 314 may decrease the sampling frequency by the external air-quality sensor 304 and increase requests for near-future external air-quality information from air-quality aggregation and assessment mechanism 320, since near-future external air-quality information from other vehicles may be more accurate and thus near-future external air-quality information would be weighted more while external air-quality information from the external air-quality sensor 304 would be weighted less.

Thus, the speed-oriented air-quality sampling is more accurate and energy-saving than periodically sampling. With the shared exterior air-quality information, the transient air-quality information from the transient air-quality map is utilized to predict road air-quality. Considering the vehicle's speed and direction better utilizes current air-quality information and predicts air-quality to accurately manage interior air-quality of the vehicle.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4A:
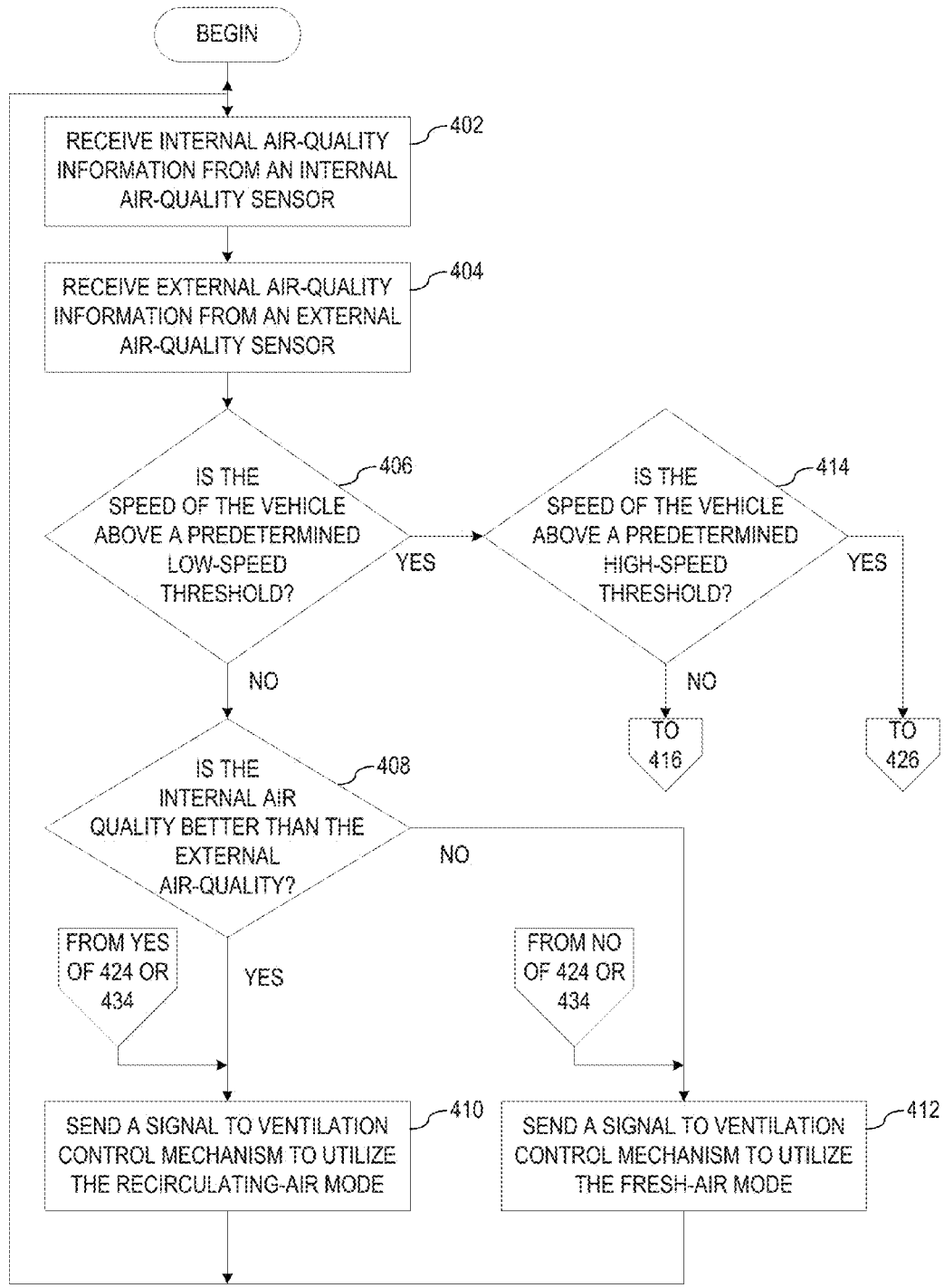
FIGS. 4A and 4B depict an exemplary flowchart of the operation performed by an intelligent automotive air-quality assessment and management mechanism in controlling the internal air-quality of a vehicle in accordance with an illustrative embodiment.
Figure 4B:
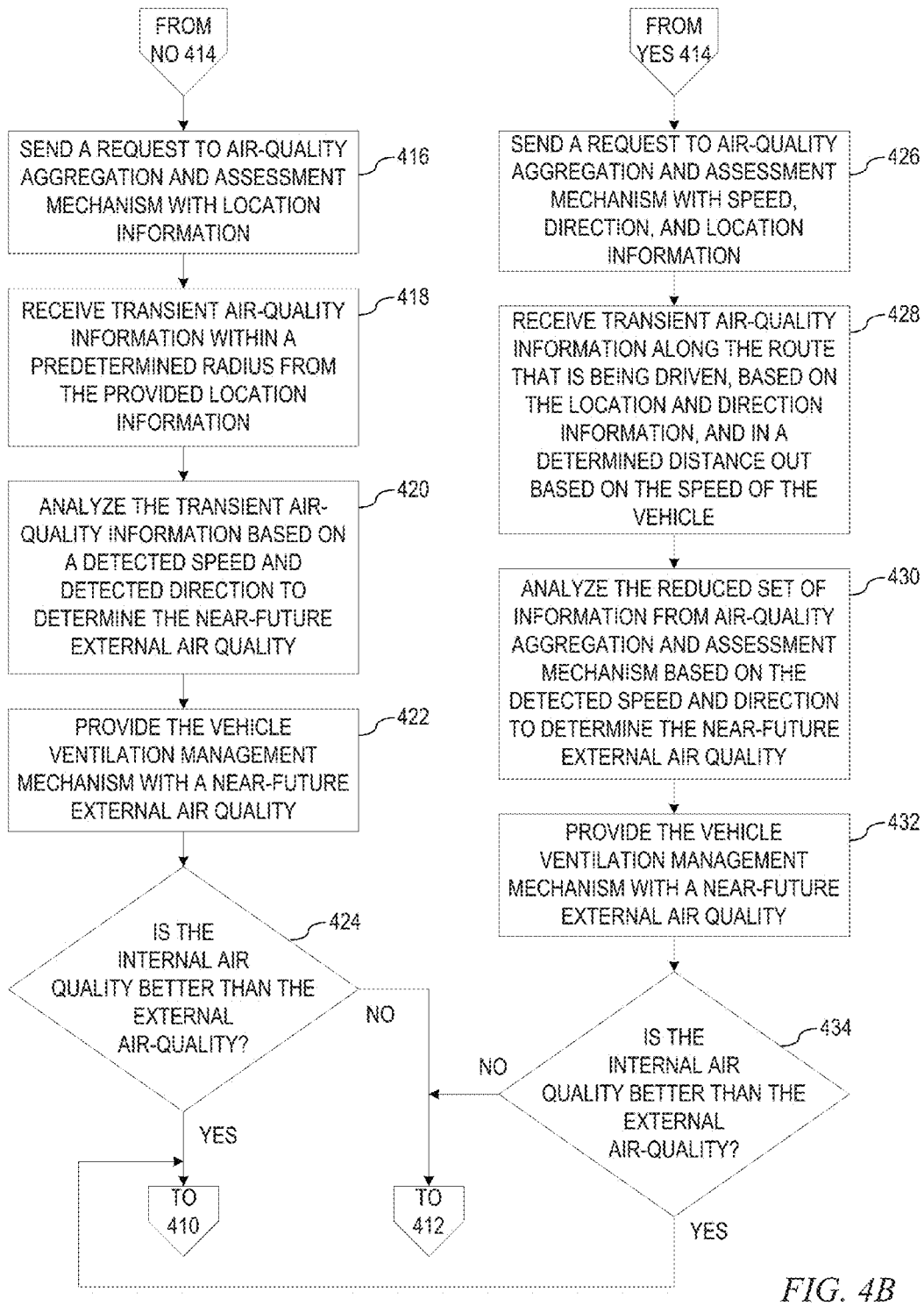

FIGS. 4A and 4B depict an exemplary flowchart of the operation performed by an intelligent automotive air-quality assessment and management mechanism in controlling the internal air-quality of a vehicle in accordance with an illustrative embodiment. As the operation begins, a vehicle ventilation management mechanism in the intelligent automotive air-quality assessment and management mechanism receives internal air-quality information from an internal air-quality sensor (step 402) and receives external air-quality information from an external air-quality sensor (step 404). The vehicle ventilation management mechanism then determines whether a sensed speed of the vehicle from a speed sensor in the vehicle is above a predetermined low-speed threshold (step 406). If at step 406 the vehicle ventilation management mechanism determines that the speed fails to be above the predetermined low-speed threshold, the vehicle ventilation management mechanism utilizes the internal air-quality information from the internal air-quality sensor and the external air-quality information from the external air-quality sensor to assess whether the internal air-quality currently being experienced by the user is better than the external air-quality (step 408). If at step 408 the vehicle ventilation management mechanism determines that the internal air-quality is better than the external air-quality, the vehicle ventilation management mechanism sends a signal to ventilation control mechanism to utilize the recirculating-air mode (step 410), which causes the ventilation control mechanism to either stay in the recirculation-air mode or switch to the recirculating-air mode, with the operation returning to step 402 thereafter. If at step 408 the vehicle ventilation management mechanism determines that the external air-quality is better than the internal air-quality, the vehicle ventilation management mechanism sends a signal to ventilation control mechanism to utilize the fresh-air mode (step 412), which causes the ventilation control mechanism to either stay in the fresh-air mode or switch to the fresh-air mode, with the operation returning to step 402 thereafter.

If at step 406 the vehicle ventilation management mechanism determines that the speed is above the predetermined low-speed threshold, then the vehicle ventilation management mechanism determines whether a sensed speed of the vehicle from the speed sensor is above a predetermined high-speed threshold (step 414). If at step 414 the vehicle ventilation management mechanism determines that the speed is above the predetermined low-speed threshold but below the predetermined high-speed threshold, a speed/direction oriented data control mechanism in the intelligent automotive air-quality assessment and management mechanism sends a request to air-quality aggregation and assessment mechanism with location information (step 416). The speed/direction oriented data control mechanism receives transient air-quality information within a predetermined radius from the provided location information from the air-quality aggregation and assessment mechanism (step 418). The speed/direction oriented data control mechanism analyzes the transient air-quality information based on a detected speed and detected direction to determine the near-future external air-quality (step 420). Based on the analysis, the speed/direction oriented data control mechanism provides the vehicle ventilation management mechanism with a near-future external air-quality (step 422).

The vehicle ventilation management mechanism utilizes the internal air-quality information from the internal air-quality sensor, the external air-quality information from the external air-quality sensor, and the near-future external air-quality from speed/direction oriented data control mechanism to assess whether the internal air-quality currently being experienced by the user is better or worse than the external air-quality (step 424). If at step 424 the vehicle ventilation management mechanism determines that the internal air-quality is better than more weighted external air-quality and the less weighted near-future external air-quality, the operation proceeds to step 410. If at step 424 the vehicle ventilation management mechanism determines that more weighted external air-quality and less weighted near-future external air-quality are better than the internal air-quality, the operation proceeds to step 412.

If at step 414 the vehicle ventilation management mechanism determines that the speed is above the predetermined low-speed threshold and above the predetermined high-speed threshold, the speed/direction oriented data control mechanism sends a request to air-quality aggregation and assessment mechanism with speed, direction, and location information (step 426). The speed/direction oriented data control mechanism receives transient air-quality information along the route that is being driven, based on the location and direction information, and in a determined distance out based on the speed of the vehicle from air-quality aggregation and assessment mechanism (step 428). The speed/direction oriented data control mechanism analyzes the reduced set of information from air-quality aggregation and assessment mechanism based on the detected speed and direction to determine the near-future external air-quality (step 430). Based on the analysis, the speed/direction oriented data control mechanism provides the vehicle ventilation management mechanism with a near-future external air-quality (step 432).

The vehicle ventilation management mechanism utilizes the internal air-quality information from the internal air-quality sensor, the external air-quality information from the external air-quality sensor, and the near-future external air-quality from speed/direction oriented data control mechanism to assess whether the internal air-quality currently being experienced by the user is better or worse than the external air-quality (step 434). If at step 434 the vehicle ventilation management mechanism determines that the internal air-quality is better than a more weighted near-future external air-quality and a less weighted external air-quality, the operation proceeds to step 410. If at step 434 the vehicle ventilation management mechanism determines that the more weighted near-future external air-quality and the less weighted external air-quality is better than the internal air-quality, the operation proceeds to step 412.

FIG. 5 depicts an exemplary flowchart of the operation performed by an intelligent automotive air-quality assessment and management mechanism in uploading external air-quality information to an air-quality aggregation and assessment mechanism in accordance with an illustrative embodiment. As the operation begins, a vehicle ventilation management mechanism receives external air-quality information from an external air-quality sensor (step 502) as well as location information from a location sensor (step 504). Upon receiving the information, the vehicle ventilation management mechanism uploads external air-quality information and the location information to an air-quality aggregation and assessment mechanism via a network (step 506), with the operation proceeding to step 502 thereafter. In an exemplary embodiment, the air-quality aggregation and assessment mechanism is a cloud-based system which the vehicle ventilation management mechanism accesses wirelessly through the network.

FIG. 6 depicts an exemplary flowchart of the operation performed by an air-quality aggregation and assessment mechanism to aggregate external air-quality information received from a plurality of vehicles in accordance with an illustrative embodiment. As the operation begins, the air-quality aggregation and assessment mechanism receives external air-quality information and the location information from the plurality of vehicles (step 602). The air-quality aggregation and assessment mechanism aggregates all of the received external air-quality information, based on the identified location information, into a transient air-quality map (step 604), with the operation ending thereafter.

FIG. 7 depicts an exemplary flowchart of the operation performed by an air-quality aggregation and assessment mechanism to provide transient air-quality information in accordance with an illustrative embodiment. As the operation begins, the air-quality aggregation and assessment mechanism receives a request from a speed/direction oriented data control mechanism of an intelligent automotive air-quality assessment and management mechanism (step 702). The air-quality aggregation and assessment mechanism determines if the request only comprises location information (step 704). If at step 704 the air-quality aggregation and assessment mechanism determines that the request only comprises location information, the air-quality aggregation and assessment mechanism responds to the speed/direction oriented data control mechanism with transient air-quality information from the transient air-quality map within a predetermined radius from the provided location information (step 706), with the operation ending thereafter. If at step 704 the air-quality aggregation and assessment mechanism determines that the request comprises location information as well as other information such as speed information and direction information, the air-quality aggregation and assessment mechanism responds to the speed/direction oriented data control mechanism with transient air-quality information from the transient air-quality map along the route that is being driven, based on the location and direction information, and in a determined distance out based on the speed of the vehicle (step 708), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for controlling the internal air-quality of a vehicle. The illustrative embodiments provide an intelligent automotive air-quality assessment and management mechanism which utilizes internal and external air-quality information along with transient air-quality information. The intelligent automotive air-quality assessment and management mechanism responds not only according to the current internal and external air-quality but also based on transient air-quality identified from the transient air-quality map retrieved based on the vehicle's speed and direction.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for controlling the internal air-quality of a vehicle, the method comprising:

determining, by the data processing system, whether a speed of the vehicle from a speed sensor in the vehicle is above a predetermined low-speed threshold;

responsive to determining that the speed fails to be above the predetermined low-speed threshold, determining, by the data processing system, whether an internal air-quality from an internal air-quality sensor is better than the external air-quality from an external air-quality sensor;

responsive to the internal air-quality being better than the external air-quality, signaling, by the data processing system, a ventilation control mechanism to utilize a recirculating-air mode, wherein the ventilation control mechanism either stays in an already initiated recirculation-air mode or switches to the recirculating-air mode; and responsive to the internal air-quality being worse than the external air-quality, signaling, by the data processing system, the ventilation control mechanism to utilize a fresh-air mode, wherein the ventilation control mechanism either stays in an already initiated fresh-air mode or switches to the fresh-air mode.

2. The method of claim 1, further comprising:
responsive to determining that the speed is above the predetermined low-speed threshold, determining, by the data processing system, whether the speed is above a predetermined high-speed threshold;
responsive to determining that the speed fails to be above the predetermined high-speed threshold, sending, by the data processing system, a request for transient air-quality data with location information from a location sensor;
receiving, by the data processing system, the transient air-quality information within a predetermined radius from the provided location information;
analyzing, by the data processing system, the transient air-quality information based on the speed and a direction of the vehicle to determine a near-future external air-quality;
determining, by the data processing system, whether the internal air-quality is better than a weighted value of the external air-quality and the near-future external air-quality;
responsive to the internal air-quality being better than the weighted value of the external air-quality and the near-future external air-quality, signaling, by the data processing system, the ventilation control mechanism to utilize the recirculating-air mode, wherein the ventilation control mechanism either stays in the already initiated recirculation-air mode or switches to the recirculating-air mode; and
responsive to the internal air-quality being worse than the weighted value of the external air-quality and the near-future external air-quality, signaling, by the data processing system, the ventilation control mechanism to utilize the fresh-air mode, wherein the ventilation control mechanism either stays in the already initiated fresh-air mode or switches to the fresh-air mode.

3. The method of claim 2, wherein the weighted value weights the external air-quality greater than the near-future external air-quality.

4. The method of claim 1, further comprising:
responsive to determining that the speed is above the predetermined low-speed threshold, determining, by the data processing system, whether the speed is above a predetermined high-speed threshold;
responsive to determining that the speed is above the predetermined low-speed threshold and above the predetermined high-speed threshold, sending, by the data processing system, a request for transient air-quality data with the speed, direction information from a direction sensor, and location information a location sensor;
receiving, by the data processing system, the transient air-quality data along a route that is being driven, based on the location and direction information, and in a determined distance out based on the speed of the vehicle;
analyzing, by the data processing system, the transient air-quality data based on the speed and the direction to determine the near-future external air-quality;
determining, by the data processing system, whether the internal air-quality is better than a weighted value of the external air-quality and the near-future external air-quality;
responsive to the internal air-quality being better than the weighted value of the external air-quality and the near-future external air-quality, signaling, by the data processing system, the ventilation control mechanism to utilize the recirculating-air mode, wherein the ventilation control mechanism either stays in the already initiated recirculation-air mode or switches to the recirculating-air mode; and
responsive to the internal air-quality being worse than the weighted value of the external air-quality and the near-future external air-quality, signaling, by the data processing system, the ventilation control mechanism to utilize the fresh-air mode, wherein the ventilation control mechanism either stays in the already initiated fresh-air mode or switches to the fresh-air mode.

5. The method of claim 4, wherein the weighted value weights the external air-quality less than the near-future external air-quality.

6. The method of claim 1, further comprising:
uploading, by the data processing system, the external air-quality information from the external air-quality sensor along with location information from a location sensor to an air-quality aggregation and assessment mechanism via a network.

7. The method of claim 6, wherein, responsive to receiving the external air-quality information and the location information from a plurality of vehicles, the air-quality aggregation and assessment mechanism aggregates all of the received external air-quality information, based on the identified location information, into a transient air-quality map.

8. The method of claim 1, further comprising:
based on the speed of the vehicle, changing, by the data processing system, a sampling frequency of external air-quality sensor inversely proportional to the speed to achieve better accuracy.

9. A computer program product comprising a computer readable storage medium having a computer readable program stored therein, wherein the computer readable program, when executed on a computing device, causes the computing device to:
determine whether a speed of a vehicle from a speed sensor in the vehicle is above a predetermined low-speed threshold;
responsive to determining that the speed fails to be above the predetermined low-speed threshold, determine whether an internal air-quality from an internal air-quality sensor is better than the external air-quality from an external air-quality sensor;
responsive to the internal air-quality being better than the external air-quality, signal a ventilation control mechanism to utilize a recirculating-air mode, wherein the ventilation control mechanism either stays in an already initiated recirculation-air mode or switches to the recirculating-air mode; and
responsive to the internal air-quality being worse than the external air-quality, signal the ventilation control mechanism to utilize a fresh-air mode, wherein the ventilation control mechanism either stays in an already initiated fresh-air mode or switches to the fresh-air mode.

10. The computer program product of claim 9, wherein the computer readable program further causes the computing device to:
responsive to determining that the speed is above the predetermined low-speed threshold, determine whether the speed is above a predetermined high-speed threshold;

responsive to determining that the speed fails to be above the predetermined high-speed threshold, send a request for transient air-quality data with location information from a location sensor;

receive the transient air-quality information within a predetermined radius from the provided location information;

analyze the transient air-quality information based on the speed and a direction of the vehicle to determine a near-future external air-quality;

determine whether the internal air-quality is better than a weighted value of the external air-quality and the near-future external air-quality;

responsive to the internal air-quality being better than the weighted value of the external air-quality and the near-future external air-quality, signal the ventilation control mechanism to utilize the recirculating-air mode, wherein the ventilation control mechanism either stays in the already initiated recirculation-air mode or switches to the recirculating-air mode; and responsive to the internal air-quality being worse than the weighted value of the external air-quality and the near-future external air-quality, signal the ventilation control mechanism to utilize the fresh-air mode, wherein the ventilation control mechanism either stays in the already initiated fresh-air mode or switches to the fresh-air mode.

11. The computer program product of claim 9, wherein the computer readable program further causes the computing device to:

responsive to determining that the speed is above the predetermined low-speed threshold, determine whether the speed is above a predetermined high-speed threshold;

responsive to determining that the speed is above the predetermined low-speed threshold and above the predetermined high-speed threshold, send a request for transient air-quality data with the speed, direction information from a direction sensor, and location information from a location sensor;

receive the transient air-quality data along a route that is being driven, based on the location and direction information, and in a determined distance out based on the speed of the vehicle;

analyze the transient air-quality data based on the speed and the direction to determine the near-future external air-quality;

determine whether the internal air-quality is better than a weighted value of the external air-quality and the near-future external air-quality;

responsive to the internal air-quality being better than the weighted value of the external air-quality and the near-future external air-quality, signal the ventilation control mechanism to utilize the recirculating-air mode, wherein the ventilation control mechanism either stays in the already initiated recirculation-air mode or switches to the recirculating-air mode; and responsive to the internal air-quality being worse than the weighted value of the external air-quality and the near-future external air-quality, signal the ventilation control mechanism to utilize the fresh-air mode, wherein the ventilation control mechanism either stays in the already initiated fresh-air mode or switches to the fresh-air mode.

12. The computer program product of claim 9, wherein the computer readable program further causes the computing device to:

upload the external air-quality information from the external air-quality sensor along with location information from a location sensor to an air-quality aggregation and assessment mechanism via a network.

13. The computer program product of claim 12, wherein, responsive to receiving the external air-quality information and the location information from a plurality of vehicles, the air-quality aggregation and assessment mechanism aggregates all of the received external air-quality information, based on the identified location information, into a transient air-quality map.

14. The computer program product of claim 9, wherein the computer readable program further causes the computing device to:

based on the speed of the vehicle, change a sampling frequency of external air-quality sensor inversely proportional to the speed to achieve better accuracy.

15. An apparatus comprising:

a processor, and a memory coupled to the processor, wherein the memory comprises instructions which, when executed by the processor, cause the processor to:

determine whether a speed of a vehicle from a speed sensor in the vehicle is above a predetermined low-speed threshold;

responsive to determining that the speed fails to be above the predetermined low-speed threshold, determine whether an internal air-quality from an internal air-quality sensor is better than the external air-quality from an external air-quality sensor;

responsive to the internal air-quality being better than the external air-quality, signal a ventilation control mechanism to utilize a recirculating-air mode, wherein the ventilation control mechanism either stays in an already initiated recirculation-air mode or switches to the recirculating-air mode; and responsive to the internal air-quality being worse than the external air-quality, signal the ventilation control mechanism to utilize a fresh-air mode, wherein the ventilation control mechanism either stays in an already initiated fresh-air mode or switches to the fresh-air mode.

16. The apparatus of claim 15, wherein the instructions further cause the processor to:

responsive to determining that the speed is above the predetermined low-speed threshold, determine whether the speed is above a predetermined high-speed threshold;

responsive to determining that the speed fails to be above the predetermined high-speed threshold, send a request for transient air-quality data with location information from a location sensor;

receive the transient air-quality information within a predetermined radius from the provided location information;

analyze the transient air-quality information based on the speed and a direction of the vehicle to determine a near-future external air-quality;

determine whether the internal air-quality is better than a weighted value of the external air-quality and the near-future external air-quality;

responsive to the internal air-quality being better than the weighted value of the external air-quality and the near-future external air-quality, signal the ventilation control mechanism to utilize the recirculating-air mode, wherein the ventilation control mechanism either stays in the already initiated recirculation-air mode or switches to the recirculating-air mode; and responsive to the internal air-quality being worse than the weighted value of the external air-quality and the near-future external air-quality, signal the ventilation control mechanism to utilize the fresh-air mode, wherein the ventilation control mechanism either stays in the already initiated fresh-air mode or switches to the fresh-air mode.

17. The apparatus of claim 15, wherein the instructions further cause the processor to:

responsive to determining that the speed is above the predetermined low-speed threshold, determine whether the speed is above a predetermined high-speed threshold;

responsive to determining that the speed is above the predetermined low-speed threshold and above the predetermined high-speed threshold, send a request for transient air-quality data with the speed, direction information from a direction sensor, and location information from a location sensor;

receive the transient air-quality data along a route that is being driven, based on the location and direction information, and in a determined distance out based on the speed of the vehicle;

analyze the transient air-quality data based on the speed and the direction to determine the near-future external air-quality;

determine whether the internal air-quality is better than a weighted value of the external air-quality and the near-future external air-quality;

responsive to the internal air-quality being better than the weighted value of the external air-quality and the near-future external air-quality, signal the ventilation control mechanism to utilize the recirculating-air mode, wherein the ventilation control mechanism either stays in the already initiated recirculation-air mode or switches to the recirculating-air mode; and responsive to the internal air-quality being worse than the weighted value of the external air-quality and the near-future external air-quality, signal the ventilation control mechanism to utilize the fresh-air mode, wherein the ventilation control mechanism either stays in the already initiated fresh-air mode or switches to the fresh-air mode.

18. The apparatus of claim 15, wherein the instructions further cause the processor to:

upload the external air-quality information from the external air-quality sensor along with location information from a location sensor to an air-quality aggregation and assessment mechanism via a network.

19. The apparatus of claim 18, wherein, responsive to receiving the external air-quality information and the location information from a plurality of vehicles, the air-quality aggregation and assessment mechanism aggregates all of the received external air-quality information, based on the identified location information, into a transient air-quality map.

20. The apparatus of claim 15, wherein the instructions further cause the processor to:

based on the speed of the vehicle, change a sampling frequency of external air-quality sensor inversely proportional to the speed to achieve better accuracy.

* * * * *